(12) United States Patent  
Fish et al.

(10) Patent No.: US 11,445,283 B2  
(45) Date of Patent: Sep. 13, 2022

(54) SYSTEMS AND METHODS FOR AUTOMATED CONFIGURATION OF TELEPHONE HEADSET INTERFACE

(71) Applicant: Plantronics, Inc., Santa Cruz, CA (US)

(72) Inventors: Dennis S. Fish, Santa Cruz, CA (US); Ching Shyu, San Jose, CA (US); Andrew Ward, Capitola, CA (US)

(73) Assignee: PLANTRONICS, INC., Santa Cruz, CA (US)

( * ) Notice: Subject to any disclaimer, the term of this patent is extended or adjusted under 35 U.S.C. 154(b) by 52 days.

(21) Appl. No.: 17/069,785

(22) Filed: Oct. 13, 2020

(65) Prior Publication Data

US 2022/0116695 A1 Apr. 14, 2022

(51) Int. Cl.
*H04M 1/05* (2006.01)
*H04R 1/10* (2006.01)
*H04L 27/26* (2006.01)

(52) U.S. Cl.
CPC ....... *H04R 1/1041* (2013.01); *H04L 27/2628* (2013.01); *H04M 1/05* (2013.01)

(58) Field of Classification Search
CPC ..... H04R 1/1041; H04L 27/2628; H04M 1/05
USPC ............ 381/74; 379/13, 26.1, 93.09, 420.04, 379/424, 430
See application file for complete search history.

(56) References Cited

U.S. PATENT DOCUMENTS

| | | | | |
|---|---|---|---|---|
| 4,910,760 A * | 3/1990 | Reformato | .......... | H04M 3/2254 379/13 |
| 6,160,872 A * | 12/2000 | Karnowski | ............ | H04M 11/06 379/93.09 |
| 7,633,963 B1 * | 12/2009 | Anderson | ........... | H04M 1/6058 370/463 |
| 2005/0135431 A1 * | 6/2005 | Lam | ......................... | H04Q 1/46 370/526 |

(Continued)

FOREIGN PATENT DOCUMENTS

WO     WO-0072555 A1 * 11/2000 .............. H04M 1/05

*Primary Examiner* — Vivian C Chin
*Assistant Examiner* — Friedrich Fahnert
(74) *Attorney, Agent, or Firm* — Slayden Grubert Beard PLLC (57) ABSTRACT

A system is provided for automated configuration of a connection interface between a headset device (e.g., a headset base) and a telephone (e.g., desktop phone). The system includes configuration circuitry designed to automatically perform a sequential analysis of multiple interface configuration options for the connection interface between the headset device and telephone. The analysis of each respective interface configuration option includes (a) accessing stored configuration information defining predefined switch positions for an array of controllable switches (e.g., optical switches) corresponding with the respective interface configuration option, (b) set the array of switches to the predefined switch positions specified by the accessed configuration information, and (c) performing a signal analysis to analyze electrical signals on the connection interface. The configuration circuitry may then select a best interface (Continued)

configuration option based on the signal analyses, and set the switches to the predefined switch positions corresponding with the selected best interface configuration option.

20 Claims, 9 Drawing Sheets

(56) References Cited

U.S. PATENT DOCUMENTS

2011/0268257 A1* 11/2011 Frandsen ............ H04M 1/6033
379/26.01

* cited by examiner

```
POS     CONFIG                          400
        T1    T2    T3    T4    T = TELx
   1    TX1   RX1   RX2   TX2
   2    TX1   Com   RX1   NC    Com = TX2+RX2
   3    TX1   TX2   RX1   RX2
   4    RX1   TX1   TX2   RX2
   5    RX1   RX2   TX1   TX2
   6    NC    RX1   Com   TX2   Com = TX1+RX2
```

*FIG. 4A*

SWITCH SETTINGS:                 450

CONFIG 1:
SW1, SW4, SW8, SW11
CONFIG2:
SW1, SW5, SW6, SW7
CONFIG 3:
SW1, SW5, SW7, SW12
CONFIG 4:
SW2, SW3, SW10, SW12
CONFIG 5:
SW2, SW6, SW9, SW11
CONFIG 6:
SW4, SW8, SW9, SW11

Example results of DFT computation showing signal vs. bin on all 6 switch position configurations.
- Bandwidth is 500Hz/32 bins = 15.625Hz bin width. B22-23 and B28-29 cover the detected dual dial tone frequencies.
- In this example, configuration 2 is the best configuration from the DFT and DC analyses.

| Config 1 | Config 2 | Config 3 | Config 4 | Config 5 | Config 6 |
|---|---|---|---|---|---|
| B1 = 0 | B1 = 2 | B1 = 3 | B1 = 0 | B1 = 0 | B1 = 0 |
| B2 = 0 | B2 = 4 | B2 = 0 | B2 = 0 | B2 = 0 | B2 = 0 |
| B3 = 0 | B3 = 3 | B3 = 0 | B3 = 0 | B3 = 0 | B3 = 0 |
| B4 = 0 | B4 = 1 | B4 = 0 | B4 = 0 | B4 = 0 | B4 = 2 |
| B5 = 0 | B5 = 3 | B5 = 0 | B5 = 0 | B5 = 0 | B5 = 1 |
| B6 = 2 | B6 = 2 | B6 = 0 | B6 = 0 | B6 = 2 | B6 = 0 |
| B7 = 2 | B7 = 1 | B7 = 2 | B7 = 1 | B7 = 0 | B7 = 0 |
| B8 = 0 | B8 = 3 | B8 = 1 | B8 = 0 | B8 = 1 | B8 = 0 |
| B9 = 0 | B9 = 3 | B9 = 0 | B9 = 1 | B9 = 0 | B9 = 0 |
| B10 = 0 | B10 = 2 | B10 = 2 | B10 = 0 | B10 = 0 | B10 = 0 |
| B11 = 1 | B11 = 6 | B11 = 1 | B11 = 0 | B11 = 0 | B11 = 0 |
| B12 = 0 | B12 = 3 | B12 = 1 | B12 = 0 | B12 = 0 | B12 = 1 |
| B13 = 0 | B13 = 5 | B13 = 0 | B13 = 0 | B13 = 0 | B13 = 0 |
| B14 = 0 | B14 = 2 | B14 = 3 | B14 = 0 | B14 = 0 | B14 = 0 |
| B15 = 1 | B15 = 6 | B15 = 0 | B15 = 0 | B15 = 2 | B15 = 1 |
| B16 = 2 | B16 = 9 | B16 = 1 | B16 = 0 | B16 = 0 | B16 = 2 |
| B17 = 2 | B17 = 3 | B17 = 1 | B17 = 0 | B17 = 0 | B17 = 0 |
| B18 = 2 | B18 = 2 | B18 = 0 | B18 = 0 | B18 = 0 | B18 = 3 |
| B19 = 5 | B19 = 3 | B19 = 0 | B19 = 0 | B19 = 0 | B19 = 0 |
| B20 = 5 | B20 = 9 | B20 = 1 | B20 = 0 | B20 = 0 | B20 = 5 |
| B21 = 13 | B21 = 22 | B21 = 1 | B21 = 0 | B21 = 1 | B21 = 12 |
| B22 = 114 | B22 = 155 | B22 = 1 | B22 = 0 | B22 = 0 | B22 = 126 |
| B23 = 98 | B23 = 128 | B23 = 5 | B23 = 0 | B23 = 7 | B23 = 192 |
| B24 = 33 | B24 = 24 | B24 = 4 | B24 = 0 | B24 = 0 | B24 = 48 |
| B25 = 12 | B25 = 10 | B25 = 0 | B25 = 0 | B25 = 0 | B25 = 21 |
| B26 = 14 | B26 = 9 | B26 = 4 | B26 = 0 | B26 = 0 | B26 = 19 |
| B27 = 33 | B27 = 19 | B27 = 3 | B27 = 0 | B27 = 0 | B27 = 38 |
| B28 = 1 | B28 = 238 | B28 = 5 | B28 = 0 | B28 = 1 | B28 = 243 |
| B29 = 5 | B29 = 100 | B29 = 8 | B29 = 0 | B29 = 2 | B29 = 47 |
| B30 = 23 | B30 = 55 | B30 = 1 | B30 = 0 | B30 = 0 | B30 = 37 |
| B31 = 8 | B31 = 35 | B31 = 1 | B31 = 0 | B31 = 0 | B31 = 18 |
| B32 = 4 | B32 = 29 | B32 = 0 | B32 = 0 | B32 = 0 | B32 = 23 |
| PICA = 1 | PICA = 1 | PICA = 1 | PICA = 1 | PICA = 1 | PICA = 1 |
| PICB = 0 | PICB = 0 | PICB = 0 | PICB = 1 | PICB = 1 | PICB = 1 |

600

PICA/PICB data provides the DC bias from the DC detector outputs:
- 0/1 or 1/0 = DC bias present
- 1/1 = no DC bias present

*FIG. 6*

Configuration 1

Dial tone in the noise

FIG. 7A

Configuration 2

Dial tone slightly better, still in the noise

FIG. 7B

Configuration 3

Possibly good dial tone

FIG. 7C

Configuration 4

Best dial tone

FIG. 7D

Configuration 5

Dial tone with harmonic distortion (bad)

FIG. 7E

Configuration 6

Dial tone with "extra" tone (bad)

FIG. 7F

SYSTEMS AND METHODS FOR AUTOMATED CONFIGURATION OF TELEPHONE HEADSET INTERFACE

TECHNICAL FIELD

The present invention relates to the field of telephone communications, and more particularly, to systems and methods for providing an automated configuration of a telephone headset interface, e.g., for connecting a headset to a corded desk phone (e.g., a business phone).

BACKGROUND

A telephone headset may be connected to a corded telephone, e.g., a business phone or other desktop phone, to provide hands-free functionality for a user. For example, a headset system may include a wireless headset and a headset base or "adapter" that communicates with the headset via Bluetooth or other wireless communications protocol. To connect the headset to the corded telephone, referred to herein as a "host phone," the user may connect a cable between the headset base and the host phone, e.g., a 4-wire cable with RJ11 connectors that plug into respective RJ11 sockets (ports) at the headset base and host phone.

However, the interface circuits for establishing a connection between the headset and corded telephone, referred to as a "host phone," are typically complicated and not standardized, even among products from the same manufacturer. Currently, when a headset base is connected to a host phone, the user must perform a manual trial-and-error process to find the correct or best configuration for the interface between the host phone and headset. For example, some existing products include mechanical or electronic switches that allow a user to manually switch between multiple different interface configuration options. In a typical scenario, the user must don the headset, take the telephone receiver off the hook, manually switch between the various switch positions, and select the switch position that provides the best dial tone audio at the headset. In addition to being inconvenient to the user, in some instances the manual configuration technique may also be inaccurate—for example, the user-selected switch position may not provide the correct interface configuration, resulting in marginal to poor performance for the headset functionality.

Thus, there is a need for improved and automated systems, circuitry, and methods for configuration of a telephone headset interface, e.g., for connecting a headset to a corded telephone, e.g., a business phone or other desktop phone.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

The above object and other objects are solved by the invention as defined in the independent claims. The dependent claims and the following specification discuss various embodiments.

As discussed above, conventional telephone headset interfaces have complicated and nonstandard configurations. However, regardless of the telephone design or model, the transmit (TX) channel has a DC biasing voltage for operating the headset microphone, and the receive (RX) channel typically has a fixed dual frequency dial tone. Embodiments of the present invention exploit these existing signals by providing automated systems, circuitry, and methods for analyzing the TX channel DC bias and the RX channel dial tone signals for each of multiple possible interface configuration options to identify and select a best interface configuration options for the telephone headset interface. Thus, embodiments of the present invention may eliminate the need for performing a manual trial-and-error process to find the best headset interface configuration as required in conventional systems discussed above.

Some embodiments provide systems, circuitry, and methods for automated configuration of a connection interface between a headset device (e.g., a headset base) and a telephone (e.g., a desktop phone or other corded phone). Such systems, circuitry, and methods may be configured to automatically perform a sequential analysis of multiple possible interface configuration options for the connection interface between the headset device and the telephone. The analysis of each respective interface configuration option includes (a) accessing stored configuration information defining predefined switch positions, for an array of controllable switches (e.g., optical switches), corresponding with the respective interface configuration option, (b) set the array of switches to the predefined switch positions specified by the accessed configuration information, and (c) performing a signal analysis to analyze electrical signals on the connection interface. A best interface configuration option may then be selected based on the signal analyses, and the switches may be set to the predefined switch positions corresponding with the selected best interface configuration option.

One aspect provides a method for automated configuration of a connection interface between a headset device and a telephone. A configuration initiation command, e.g., generated by a defined user action or input, is received at configuration circuitry provided in the headset device. In response to the configuration initiation command, the configuration circuitry performs an automated configuration process including sequentially analyzing each of a plurality of predefined interface configuration options for the connection interface between the headset device and the telephone. The analysis of each respective predefined interface configuration option includes setting a plurality of controllable switches (e.g., optical switches) to predefined switch positions corresponding with the respective predefined interface configuration option, and performing a signal analysis to analyze electrical signals on at least one channel of the connection interface. The configuration circuitry may then select a best one of the predefined interface configuration options based on the signal analysis performed for the different predefined interface configuration options, and set the switches to the predefined switch positions corresponding with the selected (best) interface configuration option.

In some embodiments, performing a signal analysis to analyze electrical signals on at least one channel of the connection interface includes (a) detecting a direct current (DC) voltage on a TX channel of the connection interface, and (b) analyzing an alternating current (AC) dial tone signal on an RX channel of the connection interface.

In some embodiments, analyzing the AC dial tone signal received from the telephone via the connection interface comprises using a Discrete Fourier Transform (DFT) or a Fast Fourier Transform (FFT).

In some embodiments, analyzing the AC dial tone signal received from the telephone via the connection interface comprises using a Discrete Fourier Transform (DFT) in combination with a bandpass filter.

In some embodiments, performing a signal analysis to analyze electrical signals on at least one channel of the connection interface includes (a) detecting a direct current (DC) voltage on a TX channel of the connection interface, (b) comparing the detected DC voltage to a predefined voltage threshold, and (c) analyzing an alternating current (AC) dial tone signal on an RX channel of the connection interface, and selecting a best interface configuration option based on the signal analysis performed for the plurality of different interface configuration options comprises identifying, from all predefined interface configuration options having a detected DC voltage that exceeds the predefined voltage threshold, the predefined interface configuration option having the best AC dial tone signal.

In some embodiments, the headset device comprises a headset base device connected to a headset by wired or wireless connection for communication of audio signals of a call received or placed via the telephone.

In some embodiments, the method further includes detecting, by the configuration circuitry, an off-hook status of the telephone, and initiating the automated configuration process by the configuration circuitry in response to detecting the off-hook status of the telephone. In some embodiments, detecting an off-hook status of the telephone comprises analyzing, by the configuration circuitry, an AC voltage and a frequency of electrical signals from the telephone.

In some embodiments, the method further includes detecting, by the configuration circuitry, an off-hook status of the telephone, and in response to detecting the off-hook status of the telephone, automatically enabling or displaying a user input interface for receiving user input to initiate the automated configuration process.

In some embodiments, the method further includes, after the automated configuration process performed by the configuration circuitry, receiving user input to select another one of the predefined interface configuration options different than the predefined interface configuration option selected by the automated configuration process.

Another aspect provides a system for automated configuration of a connection interface including a plurality of communication channels between a headset device and a telephone. The system includes (a) a plurality of controllable switches (e.g., optical switches), (b) non-transitory memory storing configuration information defining predefined switch positions corresponding with each of a plurality of predefined interface configuration options for the connection interface between the headset device and the telephone, and (c) configuration circuitry. The configuration circuitry is configured to receive a configuration initiation command, e.g., generated by a defined user action or input, and in response to receiving the configuration initiation command, sequentially analyze each of a plurality of predefined interface configuration options for the connection interface between the headset device and the telephone. The analysis of each respective predefined interface configuration option includes (i) accessing the stored configuration information from the non-transitory memory, (ii) based on the accessed configuration information, setting the plurality of switches to predefined switch positions corresponding with the respective predefined interface configuration option, and (iii) performing a signal analysis to analyze electrical signals on at least one channel of the connection interface. The configuration circuitry is further configured to select a best one of the predefined interface configuration options based on the signal analyses performed for the plurality of different interface configuration options, and set the switches to the predefined switch positions corresponding with the selected (best) interface configuration option.

In some embodiments, the configuration circuitry includes (a) direct current (DC) bias detection circuitry configured to detect a DC voltage on a TX channel of the connection interface, and (b) dial tone analysis circuitry configured to analyze an alternating current (AC) dial tone signal on an RX channel of the connection interface.

In some embodiments, the dial tone analysis circuitry includes a microcontroller processor configured to perform a Discrete Fourier Transform (DFT), and a bandpass filter connected to the microcontroller processor.

In some embodiments, the dial tone analysis circuitry is configured to analyze the AC dial tone signal using a Discrete Fourier Transform (DFT) or a Fast Fourier Transform (FFT).

In some embodiments, the configuration circuitry includes a microcontroller processor and a headset device processor. The microcontroller processor is configured to perform the signal analysis for each of the plurality of predefined interface configuration options, including for each respective predefined interface configuration option: (a) detect a direct current (DC) voltage on a TX channel of the connection interface, and (b) analyze an alternating current (AC) dial tone signal on an RX channel of the connection interface. The headset device processor is configured to select the best one of the predefined interface configuration options based at least on the detected DC voltages and analyzed AC dial tone signals.

In some embodiments, the configuration circuitry includes (a) a microcontroller processor configured to detect a direct current (DC) voltage on a TX channel of the connection interface, (b) a digital signal processor (DSP) configured to analyze an alternating current (AC) dial tone signal on an RX channel of the connection interface, and (c) a headset device processor configured to select the best one of the predefined interface configuration options based at least on the detected DC voltages and analyzed the AC dial tone signals.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION

Systems, circuitry, and methods for automated configuration of a connection interface between a headset device and a telephone are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein.

Block diagrams of example systems are illustrated and described for purposes of explanation. The functionality that is described as being performed by a single system component may be performed by multiple components. Similarly, a single component may be configured to perform functionality that is described as being performed by multiple components. For purpose of clarity, details relating to technical material that is known in the technical fields related to the invention have not been described in detail so as not to unnecessarily obscure the present invention. It is to be understood that various example of the invention, although different, are not necessarily mutually exclusive. Thus, a particular feature, characteristic, or structure described in one example embodiment may be included within other embodiments unless otherwise noted.

As discussed above, embodiments of the present invention provide systems, circuits, and methods for automated configuration of a telephone headset interface for connecting a headset to a telephone, e.g., a desktop phone or other corded phone having a dial tone.

Figure 1:
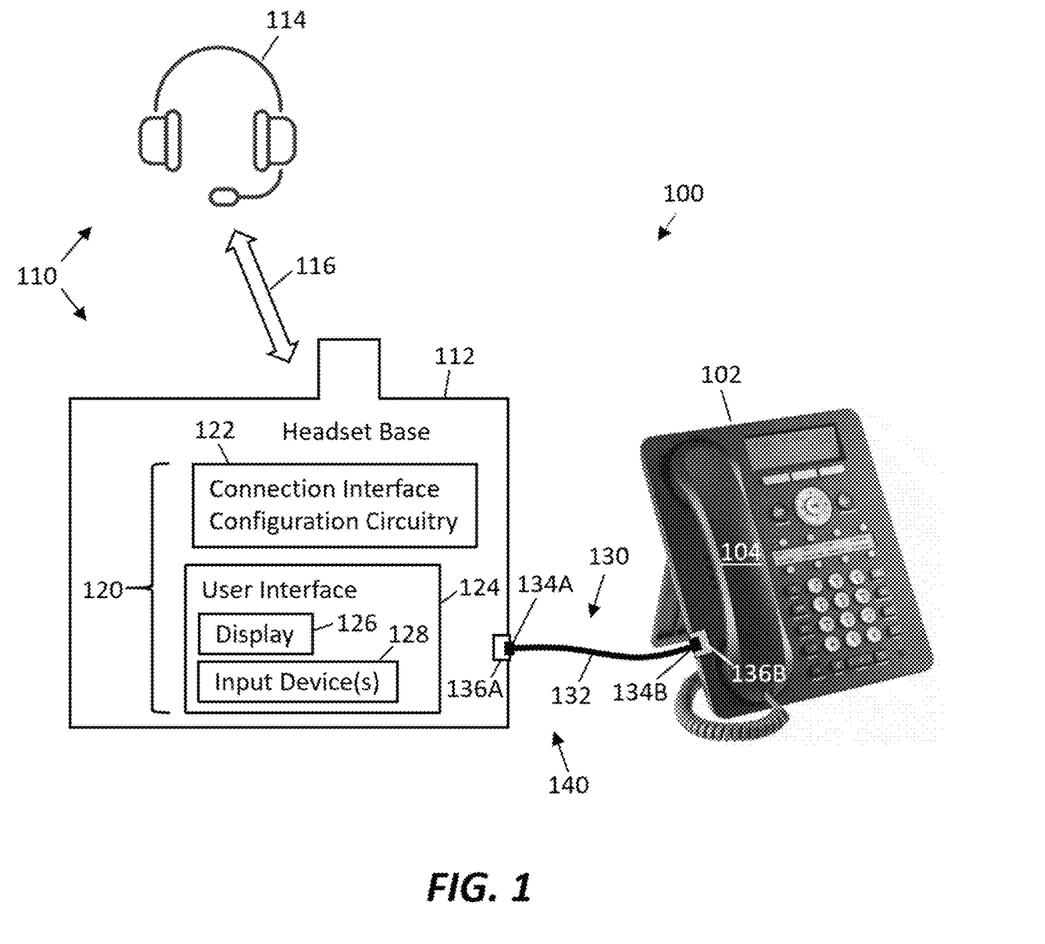
FIG. 1 illustrates an example phone system including a corded telephone connected to a headset system including a connection interface configuration system for automated configuration of a connection interface between the headset system and corded telephone, according to example embodiments of the present invention.

FIG. 1 illustrates an example system 100 including a telephone 102 connected to a headset system 110, according to example embodiments of the present invention. The headset system 110 may include a headset base or adapter 112 and a headset 114 connected to the headset base 112 by a wired or corded correction or by a wireless connection, e.g., via Bluetooth, DECT (Digital Enhanced Cordless Telecommunications), or any other suitable wireless communications protocol. The headset base 112 may be connected to the telephone 102 by a wired connection 130, to thereby provide a communication path for communication of audio signals between the telephone 102 and headset 114, thus providing a user headset functionality for phone calls received or placed via telephone 102.

Telephone 102 may be any corded telephone having a dial tone, e.g., a business phone, other desktop phone, or other corded phone. Telephone 102 may have a handset or handset 104 having a microphone and a speaker that outputs a dial tone when the handset 104 is lifted to an off-hook position. In some implementations, telephone 102 may have a separate headset jack to connect to the headset base 112, or the headset base 112 can be connected to the handset port of the telephone 102. The headset base 112 may provide an extra connection for the continued use of the telephone handset 104 in the case of the telephone handset jack being connected to the headset base 112.

In some embodiments, wired connection 130 may comprise a 4-wire cable 132 having RJ11 connectors 134A, 134B at opposing ends, which may be plugged into corresponding RJ11 sockets (ports) 136A, 136B provided at the headset base 112 and telephone 102, respectively. The 4-wire cable 132 may define two available communication channels, wherein each pair of wires provides one channel. Many existing telephones, e.g., many business phones, desktop phones, or other corded phones, include an RJ11 socket provided for connection of suitable external devices, e.g., a headset device. In other embodiments, wired connection 130 may include any other suitable type of cable 132 (e.g., including any number of conductors, signals, or channels) and any other suitable type of physical connection devices 134A, 134B, 136A, 136B.

As shown, the headset base 112 may include a connection interface configuration system 120 configured to provide an automated configuration of the interface between the telephone 102 and headset system 110 to allow effective communication of audio signals between the telephone 102 and headset system 110, e.g., thereby replacing the need for manual configuration of such interface as required with conventional headset products. This interface between telephone 102 and headset system 110 for allowing effective audio communication between telephone 102 and headset system 110 is referred to herein as the "audio connection interface," indicated at 140.

The connection interface configuration system 120 may include any suitable hardware, software, and/or firmware components for providing any of the functionality disclosed herein. As shown in FIG. 1, the connection interface configuration system 120 may include connection interface configuration circuitry 122 (shown in more detail in FIGS. 3A and 3B discussed below) and user interface 124. Connection interface configuration circuitry 122 may include or utilize components (e.g., hardware, software, and/or firmware components) present in existing products (e.g., utilization of the main processor of the headset base 112), along with additional components (e.g., hardware, software, and/ or firmware components) for automated configuration of the audio connection interface 140 as disclosed herein.

User interface 124 may include any one or more types of interfaces for receiving input from and/or outputting information to a user. For example, user interface 124 may include a display device 126 (e.g., an LCD display, LED screen, or one or more discrete LEDs) and/or input device(s) 128 (e.g., physical or virtual buttons, switches, or sliders). In some embodiments, user interface 124 includes a touchscreen (e.g., LED touchscreen) that acts both as a display 126 and input device 128. User interface 124 may include an input device 128 allowing a user to initiate an automated configuration of the audio connection interface 140, e.g., a physical or virtual button. In some embodiments, before initiating an automated configuration of the audio connection interface 140, the telephone handset 104 must taken off-hook, to activate a dial tone. In one example embodiment, user interface 124 may be configured to display a menu allowing the user to navigate to and select an "Automatic Configuration" option, which sends an interface configuration command to a processor (e.g., a main processor of the headset base 112). The processor receives the interface configuration command, and if the telephone handset 104 is off-hook (such that a dial tone is present at the handset 104), the processor may automatically initiate and perform an automated configuration of the audio connection interface 140. The displayed menu including the "Automatic Configuration" option may be displayed and navigated using a touchscreen, or a non-touchscreen display combined with physical buttons for navigating and selecting options on the displayed menu.

The connection interface configuration circuitry 122 (also referred to herein as "configuration circuitry 122" for convenience) may be configured to receive the interface configuration command generated in response to a defined user input as discussed above, and in response, initiate and perform an automated configuration of the audio connection interface 140. For example, configuration circuitry 122 may sequentially analyze each of multiple predefined interface configuration options for the connection interface between the headset system 110 and telephone 102. Each of the multiple predefined interface configuration options may define a designated use for each communication channel in the 4-wire cable 132 connecting the headset base 112 to telephone 102. For example, each predefined interface configuration option may define one of the following designated uses for each of the four signals provided in the 4-wire cable 132: (a) TX channel, (b) RX channel, (c) common signal (TX and RX), or (d) unused connection.

As discussed in more detail below, e.g., with reference to FIGS. 2-5, the configuration circuitry 122 may analyze each respective predefined interface configuration option by a process including: (a) accessing stored configuration information from the non-transitory memory, (b) based on the accessed configuration information, setting a plurality of controllable switches (e.g., optical switches) to predefined switch positions corresponding with the respective predefined interface configuration option, and (c) performing a signal analysis to analyze electrical signals on one or more connection channels provided by cable 132. The signal analysis may include (a) detection of direct current (DC) signal from the telephone 102 on a TX channel and (b) analysis of an alternating current (AC) dial tone signal from the telephone 102 on an RX channel. After completing the signal analysis for the multiple predefined interface configuration options, the configuration circuitry 122 may select a best one of the predefined interface configuration options based on the results of the signal analysis, and set the switches to the predefined switch positions corresponding with the selected (best) interface configuration option.

Figure 2:
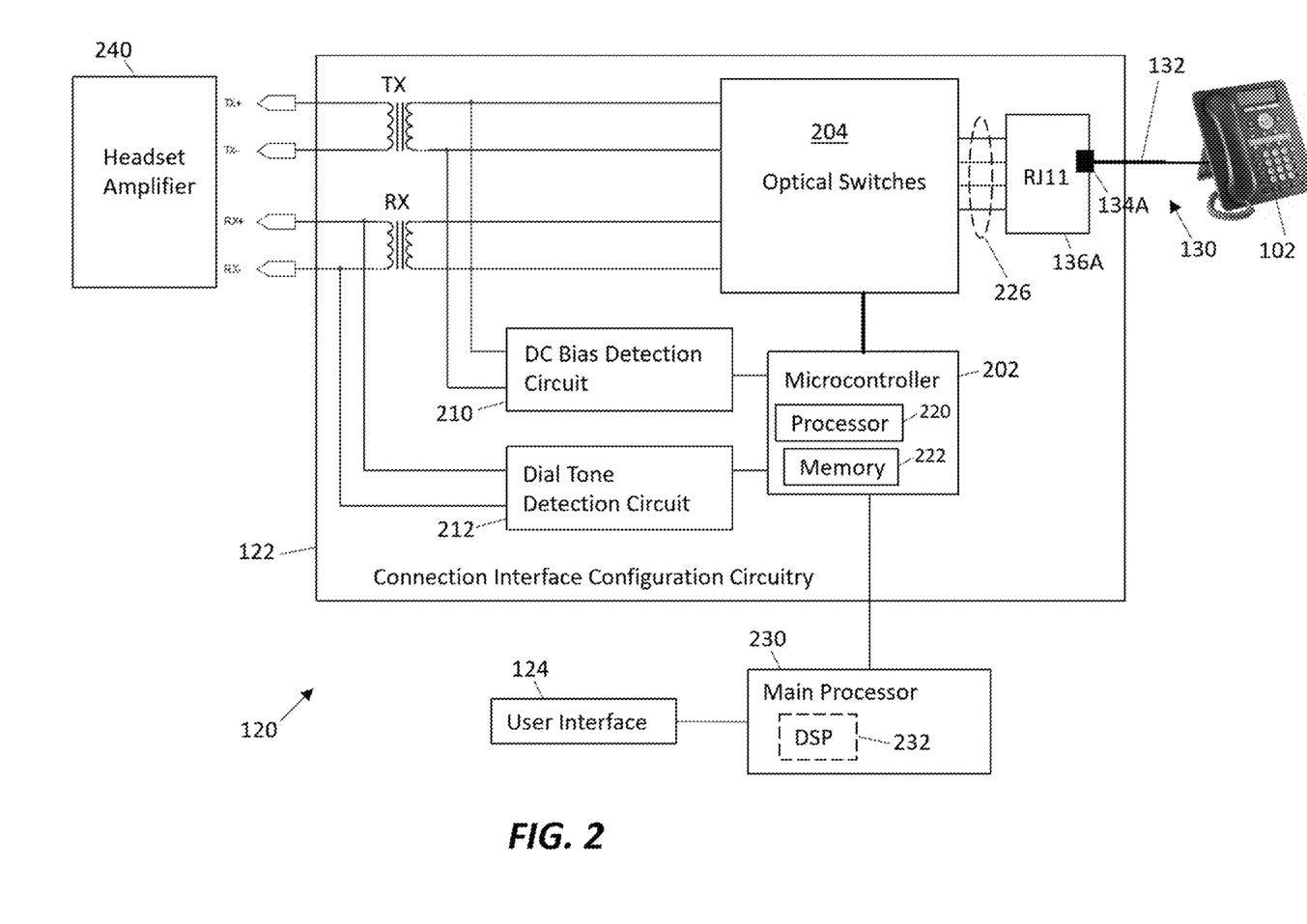
FIG. 2 is a block diagram of an example connection interface configuration system, according to example embodiments of the present invention.

FIG. 2 is a block diagram of an example connection interface configuration system 120 of system 100 shown in FIG. 1, according to one example embodiment. The connection interface configuration system 120 may include configuration circuitry 122 and particular aspects or functionality of user interface 124, and may also utilize a main processor 230 of the headset base 112, which may include a DSP 232 (which may be used in some embodiments for performing a Fast Fourier Transform (FFT) analysis of a dial tone signal, e.g., as discussed below with reference to FIG. 3B).

Configuration circuitry 122 may include (a) a headset base connector 136A for receiving a cable 132 connected to telephone 102, (b) a microcontroller 202 (e.g., PIC processor), (c) an array of controllable switches 204 (e.g., optical switches), (d) DC bias detection circuitry 210, and (e) AC dial tone analysis circuitry 212. Microcontroller 202 may include a processor 220, memory 222, and other suitable microcontroller circuitry. Each of DC bias detection circuitry 210 and AC dial tone analysis circuitry 212 may cooperate with microcontroller 202, main processor 230, and/or other component(s) of connection interface configuration system 120 for providing the DC bias detection functionality and AC dial tone analysis functionality disclosed herein.

As discussed above, in one embodiment headset base connector 136A may comprise an RJ11 socket configured to receive an RJ11 connector 134A at one end of a 4-wire cable 132 having a second end connected to telephone 102. The array of switches 204 may include any suitable number and type or types of switches, e.g., optical switches or other type(s) of switches, that may be controlled by a processor, e.g., microcontroller processor 220 to set up multiple different interface configuration options, each interface configuration option defining a designated use for each connection signal 226 in the audio connection interface 140 (or each of a subset of the connection signals 226). Example designated uses for each connection signal 226 include (a) TX channel, (b) RX channel, (c) common signal (TX and RX), and (d) unused connection.

Figure 4A:
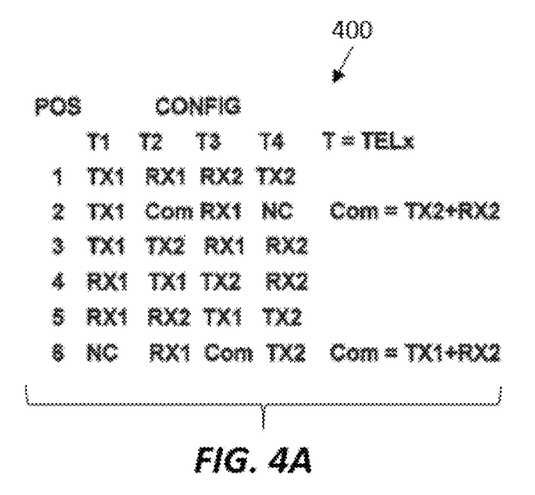
FIG. 4A illustrates an example table of interface configuration options that may be analyzed by a connection interface configuration system to identify and select a best interface configuration option, according to one example embodiment.
Figure 4B:
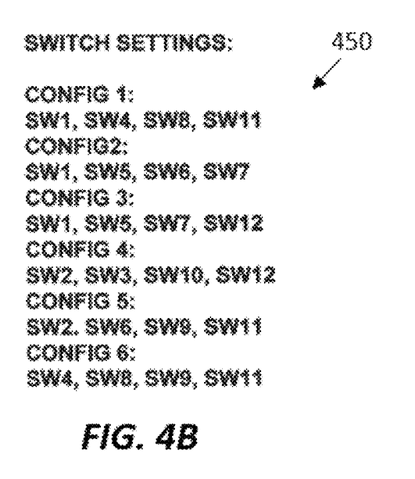
FIG. 4B illustrates example switch settings for establishing each interface configuration option shown in FIG. 4A, according to one example embodiment.

In some embodiments, the number of switches 204 is defined by a minimum number of switches needed to effectively analyze a set of interface configuration options for a number of available connection signals 226 provided in the audio connection interface 140 (e.g., as defined by the number of wires or channels provide in wired connection 130). For example, in one embodiment, audio connection interface 140 includes four connection signals 226 (as defined by a 4-wire cable 132), and the array of switches 204 includes 12 switches controlled by microcontroller 202 to set up 6 different interface configuration options (e.g., as shown in FIGS. 4A-4B discussed below), which may each be sequentially analyzed in order to select the best interface configuration option for the audio connection interface 140.

Switches 204 may comprise any suitable type of electronically controllable switches or relays. In some embodiments, switches 204 may comprise any type of electronically controllable switches or relays that provide a minimum amount of electrical isolation from the respective telephone lines, e.g., as required by IEC/EN/UL/CSA 62368-1 or other relevant standard. In such embodiments, switches 204 may comprise optical switches or relays suitable for providing the required isolation.

In some embodiments, an automated configuration request is communicated to main processor 230, e.g., in response to a defined user input received via user interface 124 as discussed above, or in an alternative embodiment, automatically in response to configuration system 120 (a) detecting the telephone handset 104 being taken off-hook and (b) determining the audio connection interface 140 is currently not configured.

In response to receiving the automated configuration request, the main processor 230 may send commands to the microcontroller processor 220 (e.g., PIC processor) to sequentially set up and analyze all predefined interface configuration options.

To analyze each respective interface configuration option, microcontroller processor 220 may first set up the respective interface configuration option by (a) accessing stored switch settings, e.g., from microcontroller memory 222, for the respective interface configuration option, and (b) controlling switches 204 based on the accessed switch settings. The switch settings may set a designated use for each relevant connection signal 226, as discussed above. After setting switches 204 based on the respective interface configuration option, microcontroller processor 220 may analyze the quality of the respective interface configuration option by performing or facilitating (a) a detection/analysis of a TX channel DC bias (e.g., DC voltage on the headset microphone from telephone 104) and (b) an analysis of an RX channel AC dial tone signal from the telephone 104).

Figure 3A:
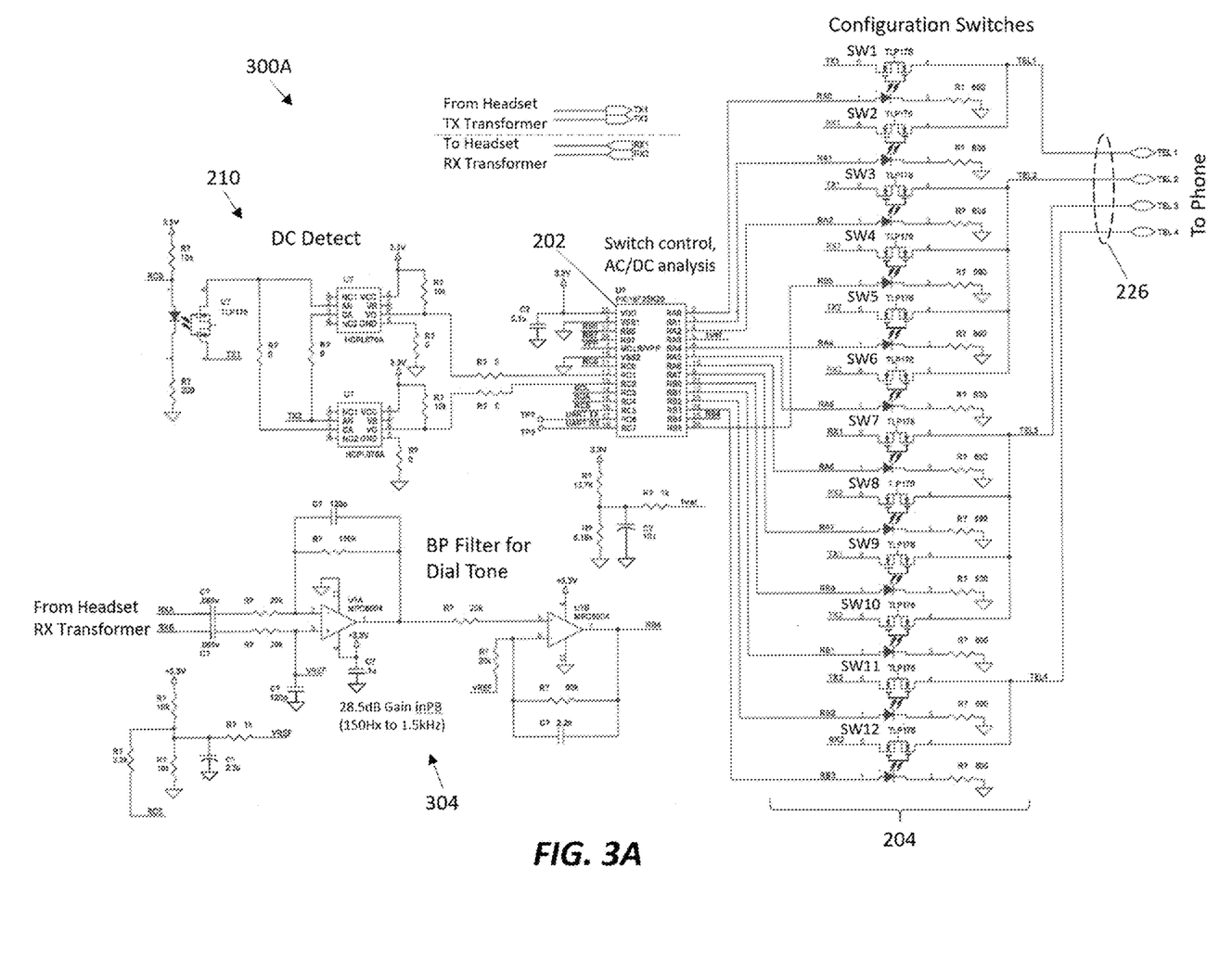
FIG. 3A illustrates first example circuitry for a connection interface configuration system, according to one example embodiment.

In a first embodiment, e.g., as shown in FIG. 3A discussed below, the microprocessor processor 220 analyzes the TX channel DC bias and RX channel AC dial tone signal at the same time.

For the DC bias analysis, the microprocessor processor 220 may control DC bias detection circuitry 210 to detect the DC voltage on the TX channel (as defined by the relevant interface connection option), e.g., connected to the headset microphone. DC bias detection circuitry 210 may compare the detected DC voltage to a predefined threshold voltage and communicate the results to microcontroller processor 220. A DC bias is deemed to be "present" on the TX channel if the detected DC voltage meets or exceeds the predefined threshold voltage, and deemed to be "not present" if the detected DC voltage is less than the predefined threshold voltage.

For the AC dial tone signal analysis, the microcontroller processor 220 analyzes the AC signal using a Discrete Fourier Transform (DFT) and utilizes an external bandpass filter for the improved accuracy (e.g., bandpass filter 304 shown in FIG. 3A).

After analyzing all of the different interface configuration options, processor 220 may then select the interface configuration option having the best performing dial tone that also has a "present" DC bias on the TX channel. Processor 220 may then control the switches 204 to the switch positions corresponding with the selected (best) interface configuration option.

Figure 3B:
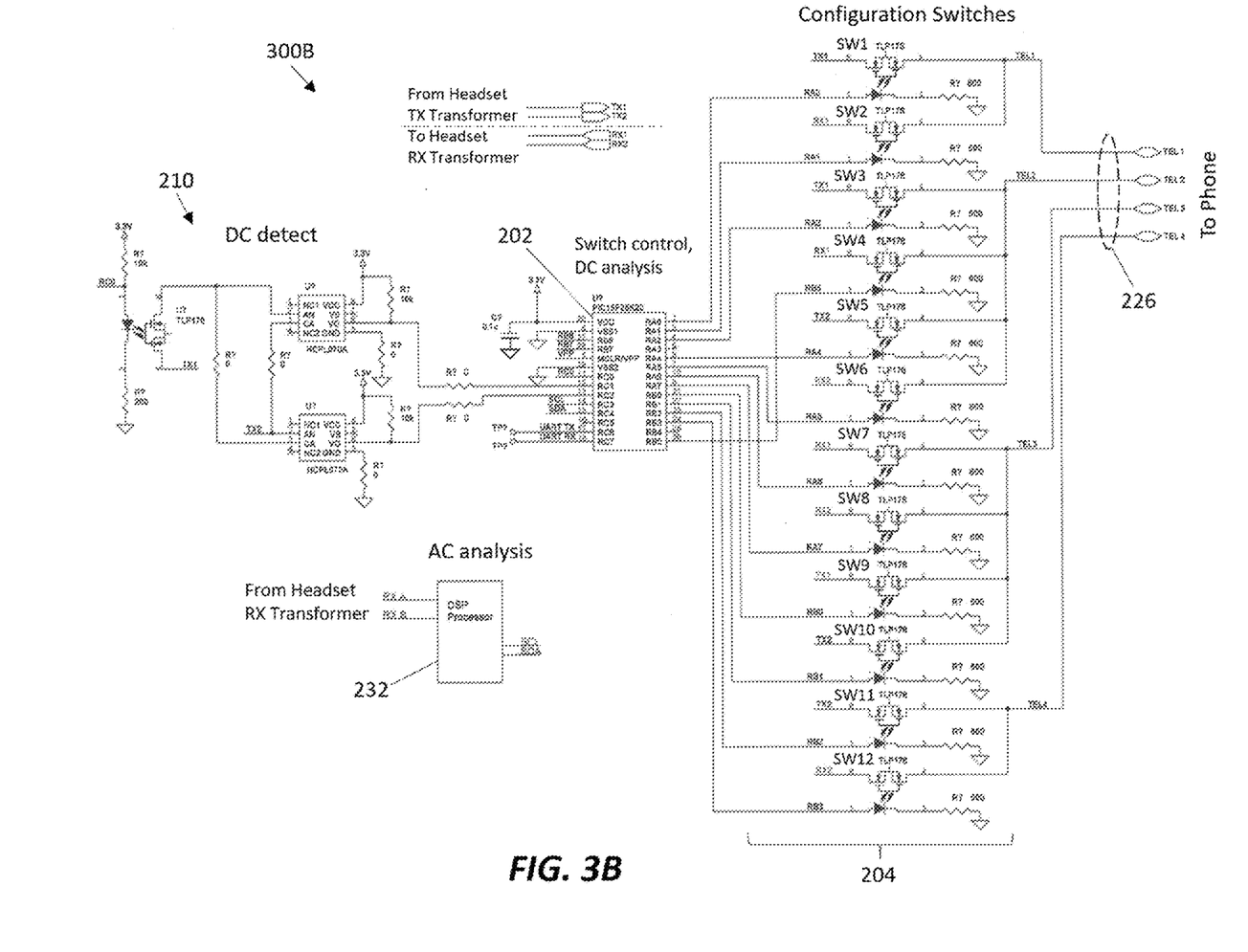
FIG. 3B illustrates second example circuitry for a connection interface configuration system, according to another example embodiment.

In a second embodiment, e.g., as shown in FIG. 3B discussed below, the microcontroller processor 220 performs the DC bias analysis as in the first embodiment discussed above. However, in contrast to the first embodiment, in the second embodiment the AC dial tone signal is analyzed by the main processor 230 (utilizing DSP 232) using a Fast Fourier Transform (FFT). The FFT analysis does not require an external bandpass filter. After analyzing all of the different interface configuration options, the main processor 230 may then select the interface configuration option having the best FFT results (best dial tone signal) that also has a "present" DC bias on the TX channel. Main processor 230 may then command microcontroller processor 220 to control switches 204 to the switch positions corresponding with the selected (best) interface configuration option.

FIG. 3A illustrates first example connection interface configuration circuitry 300A for connection interface configuration system 120 shown in FIG. 1, according to one example embodiment. Connection interface configuration circuitry 300A includes an array of 12 optical switches 204 (SW1-SW12) selectively coupled to four connection signals 226, a microcontroller PIC processor 202, DC bias detection circuitry 210, and a bandpass filter 304 for the AC dial tone signal analysis.

FIG. 3B illustrates first example connection interface configuration circuitry 300B for connection interface configuration system 120 shown in FIG. 1, according to one example embodiment. Like connection interface configuration circuitry 300A shown in FIG. 3A, connection interface configuration circuitry 300B includes an array of 12 optical switches 204 (SW1-SW12) selectively coupled to four connection signals 226, a microcontroller PIC processor 202, and DC bias detection circuitry 210. However, unlike configuration circuitry 300A shown in FIG. 3A, configuration circuitry 300B includes a DSP 232 for performing the AC dial tone signal analysis.

FIG. 4A illustrates an example table 400 for six different interface configuration options for an example audio connection interface 140, according to one example embodiment. In this example, the audio connection interface 140 includes four connection signals 226 (e.g., corresponding with a 4-wire interface cable 132), indicated at T1, T2, T3, and T4. Table 400 stores channel designation settings for the four connection signals 226 for each of the six interface configuration options. The channel designation settings define a designated use for each of the four connection signals 226, wherein the designated use for each signal 226 is either TX1 (first transmit signal), TX2 (second transmit signal), RX1 (first receive signal), RX2 (second receive signal), Com (common TX and RX signal), or NC (unused connection).

As discussed herein, an automated configuration of the audio connection interface 140 may involve analyzing each of the multiple interface configuration options to select the best interface configuration option. To analyze each respective interface configuration option, a processor (e.g., main processor 230 or microcontroller processor 220) may access the channel designation settings specified in table 400 for the respective interface configuration option, and control switches 204 (e.g., optical switches SW1-SW12 shown in FIGS. 3A and 3B) to set the specified channel designations for connection signals 226.

FIG. 4B illustrates example switch settings 450 for the 12 optical switches SW1-SW12 shown in FIGS. 3A and 3B to establish the specified channel designations for each of the six interface configuration options shown in FIG. 4A, according to one example embodiment. For example, referring to switch settings 450, microcontroller processor 220 may activate switches SW1, SW4, SW8, and SW11 to set up Configuration 1 shown in FIG. 4A.

Figure 5:
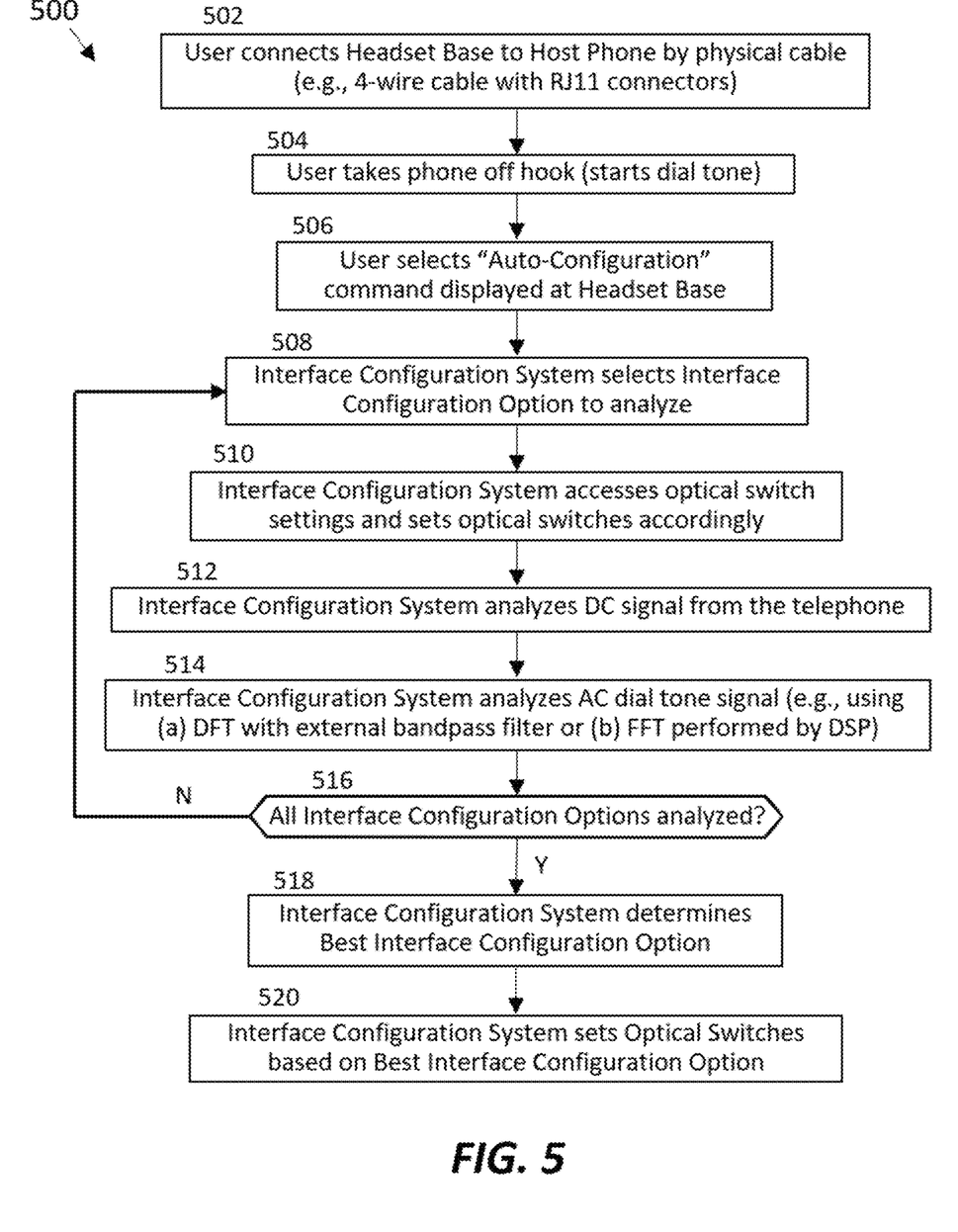
FIG. 5 illustrates an example method for automated configuration of a connection interface between a headset system and corded telephone, according to example embodiments of the present invention.

FIG. 5 illustrates an example method 500 for automated configuration of an audio connection interface 140 between a headset system 110 and corded telephone 102, according to one example embodiment. At 502, a user connects a headset base 112 of a headset system 110 to a telephone 102 by a physical cable 132, e.g., a 4-wire cable with RJ11 connectors as discussed above. At 504, the user takes the telephone handset 104 off hook, which starts a dial tone. At 506, the user provides user input to request an automated configuration of the audio connection interface 140. For example, the user may interface with an input device 128 (e.g., touchscreen or physical buttons) to locate and select an "Auto-Configuration" option or other suitable option displayed at a display 126 provided at the headset base 112.

At 508, in response to the automated configuration request initiated by the user, the connection interface configuration system 120 provided in the headset base 112 may initiate the automated configuration by selecting a first interface configuration option to analyze. At 510, the configuration system 120 accesses optical switch settings from memory and sets optical switches 204 accordingly, to define a TX channel and RX channel of the audio connection interface 140. At 512, the configuration system 120 detects the presence (or no presence) of a DC voltage on the defined TX channel. At 514, the configuration system 120 analyzes an AC dial tone signal on the defined RX channel from the telephone 102, e.g., using (a) a discrete Fourier Transform (DFT) and external bandpass filter or (b) a Fast Fourier Transform (FFT) analysis performed by a DSP.

At 516, the configuration system 120 determines whether all interface configuration options have been analyzed. If not, the configuration system 120 returns to step 508 to select a next interface configuration option to analyze. If all interface configuration options have been analyzed, the method proceeds to 518, where the configuration system 120 determines the best interface configuration option based on the analyses performed at steps 508-514. At 520, the configuration system 120 sets the optical switches to positions corresponding with the interface configuration option selected at 518.

Figure 6:
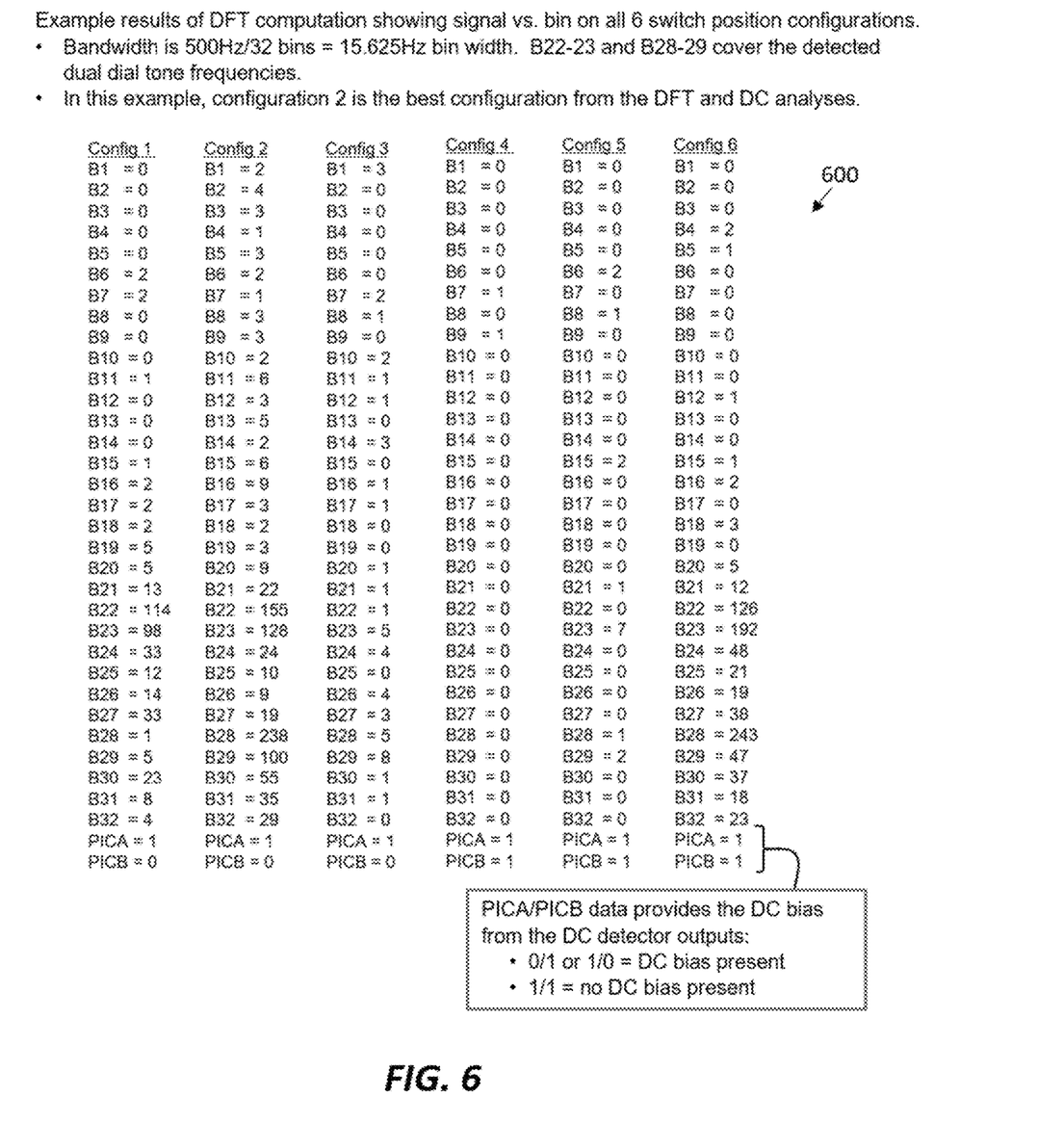
FIG. 6 shows example results of a Discrete Fourier Transform (DFT) analysis of an AC dial tone signal and DC bias for six interface configuration options, which may be used for selecting a best interface configuration option, according to one example embodiment.
Figure 7A:
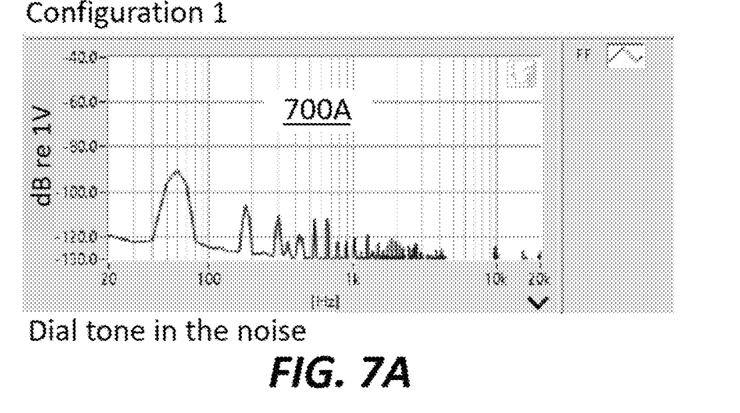
FIGS. 7A-7F show example result of a Fast Fourier Transform (FFT) analysis of an AC dial tone signal for six interface configuration options, which may be used for selecting a best interface configuration option, according to one example embodiment.
Figure 7B:
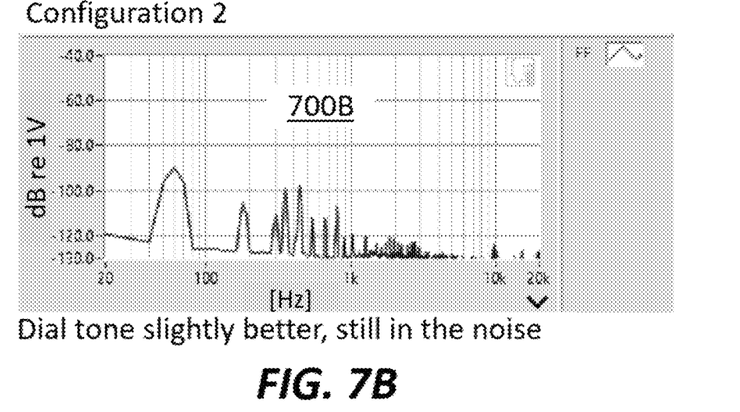
Figure 7C:
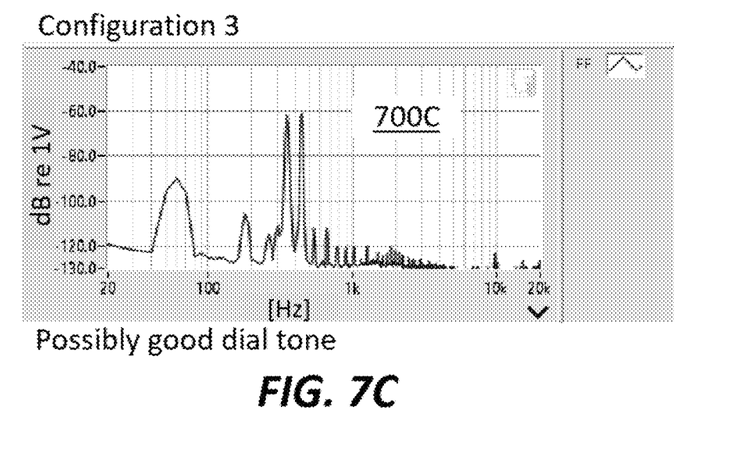
Figure 7D:
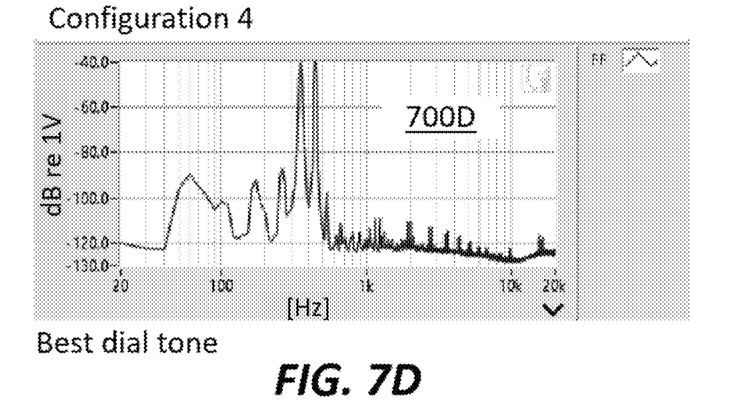
Figure 7E:
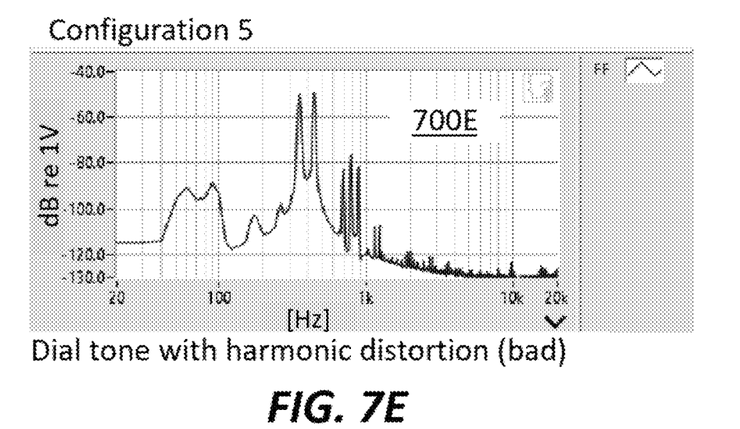
Figure 7F:
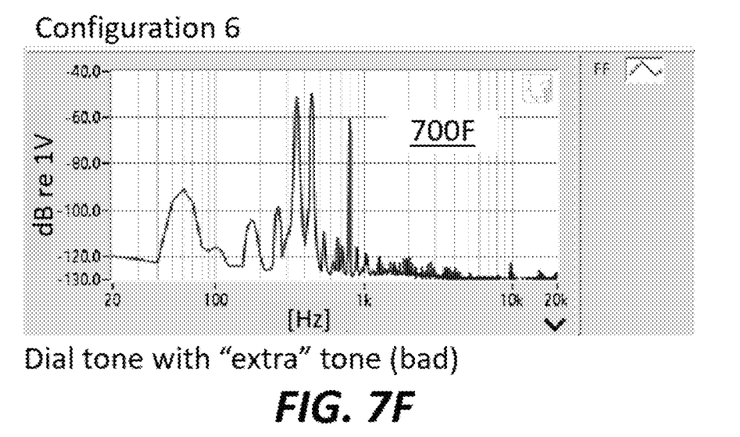

FIG. 6 shows example data 600 from a Discrete Fourier Transform (DFT) analysis of an AC dial tone signal and DC bias for six different interface configuration options (configurations 1-6) for an example audio connection interface 140, e.g., performed by microcontroller processor 220 and bandpass filter 304 in the example embodiment shown in FIG. 3A, according to one example embodiment. The DFT data 600 indicates values for a defined set of 32 bins (B1-B32) representing 32 different frequency bands, in which bins B22-B23 and B28-B29 cover the relevant dial tone frequencies.

Data 600 also shows data from the DC detector circuitry 210 (see FIG. 3A), indicated at "PICA" and "PICB." PICA and PICB values of 0 and 1, or 1 and 0 indicate a DC bias is present on the TX channel. PICA and PICB values of 1 and 1 indicate no DC bias is present on the TX channel.

The microcontroller processor 220 may select the best interface configuration option based on the respective bin values according to any suitable rules or algorithm. In the illustrated example, Configuration 2 is the best interface configuration option based on the DFT dial tone signal analysis and DC bias analysis (from data 600) of the six interface configuration options.

In addition, as shown at the bottom of data 600, the PICA and PICB data provides the DC bias detection. For each interface configuration option (configurations 1-6), PICA/PICB values of 0/1 or 1/0 indicate a DC bias is present, while PICA/PICB values of 1/1 indicate a DC bias is not present.

FIGS. 7A-7F show example results 700A-700F of a Fast Fourier Transform (FFT) analysis of an AC dial tone signal for six different interface configuration options for an example audio connection interface 140, e.g., performed by a DSP 230 in the example embodiment shown in FIG. 3B, according to one example embodiment. The FFT results 700A-700F may be used, e.g., in combination with results of a DC bias detection, to select a best interface configuration option, e.g., as discussed above. In one example, the interface configuration option having the dial tone FFT signal with the highest magnitude and best signal/noise ratio and lowest distortion may be selected as the best interface configuration option. In this example, configuration 4 shown in FIG. 7D has the best dial tone, and may thus be selected as the best interface configuration option, if a DC bias is also detected for configuration 4.

While the exemplary embodiments of the present invention are described and illustrated herein, it will be appreciated that they are merely illustrative and that modifications can be made to these embodiments without departing from the spirit and scope of the invention. Acts described herein may be computer readable and executable instructions that can be implemented by one or more processors and stored on a computer readable memory or articles. The computer readable and executable instructions may include, for example, application programs, program modules, routines and subroutines, a thread of execution, and the like. In some instances, not all acts may be required to be implemented in a methodology described herein.

Terms such as "component", "module", and "system" are intended to encompass software, hardware, or a combination of software and hardware. For example, a system or component may be a process, a process executing on a processor, or a processor. Furthermore, a functionality, component or system may be localized on a single device or distributed across several devices. The described subject matter may be implemented as an apparatus, a method, or article of manufacture using standard programming or engineering techniques to produce software, firmware, hardware, or any combination thereof to control one or more computing devices.

Thus, the scope of the invention is intended to be defined only in terms of the following claims as may be amended, with each claim being expressly incorporated into this Description of Specific Embodiments as an embodiment of the invention.

What is claimed is:

1. A method for automated configuration of a connection interface between a headset device and a telephone, the method comprising:
    receiving, at configuration circuitry provided in the headset device, a configuration initiation command; and
    in response to the configuration initiation command, performing an automated configuration process by the configuration circuitry, including:
        sequentially analyzing each of a plurality of predefined interface configuration options for the connection interface between the headset device and the telephone, wherein analyzing each respective predefined interface configuration option comprises:
            setting a plurality of controllable switches to predefined switch positions corresponding with the respective predefined interface configuration option; and
            performing a signal analysis to analyze electrical signals on at least one channel of the connection interface, including:
                detecting a direct current (DC) voltage on a TX channel of the connection interface;
                comparing the detected DC voltage to a predefined voltage threshold; and
                analyzing an alternating current (AC) dial tone signal on an RX channel of the connection interface; and
        based on the signal analysis performed for each of the plurality of predefined interface configuration options, selecting, from all predefined interface configuration options having a detected DC voltage that exceeds the predefined voltage threshold, the predefined interface configuration option having the best AC dial tone signal; and
        setting the plurality of controllable switches to the predefined switch positions corresponding with the selected predefined interface configuration option.

2. The method of claim 1, wherein the plurality of controllable switches comprise optical switches.

3. The method of claim 1, wherein analyzing the AC dial tone signal on the RX channel comprises using a Discrete Fourier Transform (DFT) or a Fast Fourier Transform (FFT).

4. The method of claim 1, wherein analyzing the AC dial tone signal on the RX channel comprises using a Discrete Fourier Transform (DFT) in combination with a bandpass filter.

5. The method of claim 1, wherein the headset device comprises a headset base device connected to a headset by wired or wireless connection for communication of audio signals of a call received or placed via the telephone.

6. The method of claim 1, further comprising:
   detecting, by the configuration circuitry, an off-hook status of the telephone; and
   initiating the automated configuration process by the configuration circuitry in response to detecting the off-hook status of the telephone.

7. The method of claim 1, wherein detecting an off-hook status of the telephone comprises analyzing, by the configuration circuitry, an AC voltage and a frequency of electrical signals from the telephone.

8. The method of claim 1, further comprising:
   detecting, by the configuration circuitry, an off-hook status of the telephone; and
   in response to detecting the off-hook status of the telephone, automatically enabling or displaying a user input interface for receiving user input to initiate the automated configuration process.

9. The method of claim 1, further comprising analyzing an outbound test call from the telephone to analyze an outbound transmission path of the connection interface.

10. The method of claim 1, further comprising, after the automated configuration process performed by the configuration circuitry, receiving user input to select another one of the predefined interface configuration options different than the predefined interface configuration option selected by the automated configuration process.

11. A system for automated configuration of a connection interface between a headset device and a telephone, the system comprising:
   a plurality of controllable switches;
   non-transitory memory storing configuration information defining predefined switch positions corresponding with each of a plurality of predefined interface configuration options for the connection interface between the headset device and the telephone; and
   configuration circuitry configured to:
      receive a configuration initiation command; and
      in response to the configuration initiation command, sequentially analyze each of a plurality of predefined interface configuration options for the connection interface between the headset device and the telephone, wherein analyzing each respective predefined interface configuration option comprises:
         accessing the stored configuration information from the non-transitory memory;
         based on the accessed configuration information, setting the plurality of controllable switches to predefined switch positions corresponding with the respective predefined interface configuration option; and
         performing a signal analysis to analyze electrical signals on at least one channel of the connection interface, including:
            detecting a direct current (DC) voltage on a TX channel of the connection interface; and
            analyzing an alternating current (AC) dial tone signal on an RX channel of the connection interface; and
      select a best one of the predefined interface configuration options based at least on the detected DC voltages and analyzed the AC dial tone signals for the plurality of predefined interface configuration options; and
      set the plurality of controllable switches to the predefined switch positions corresponding with the selected predefined interface configuration option.

12. The system of claim 11, wherein the plurality of controllable switches comprise optical switches.

13. The system of claim 11, wherein the configuration circuitry includes:
   DC bias detection circuitry configured to detect the DC voltage on the TX channel of the connection interface; and
   dial tone analysis circuitry configured to analyze the AC dial tone signal on the RX channel of the connection interface.

14. The system of claim 13, wherein the dial tone analysis circuitry includes:
   a microcontroller processor configured to perform a Discrete Fourier Transform (DFT); and
   a bandpass filter connected to the microcontroller processor.

15. The system of claim 13, wherein the dial tone analysis circuitry is configured to analyze the AC dial tone signal using a Discrete Fourier Transform (DFT) or a Fast Fourier Transform (FFT).

16. The system of claim 11, wherein the configuration circuitry includes:
   a microcontroller processor configured to perform the signal analysis for each of the plurality of predefined interface configuration options, including for each respective predefined interface configuration option:
      detect the DC voltage on the TX channel of the connection interface; and
      analyze the AC dial tone signal on the RX channel of the connection interface; and
   a headset device processor configured to select the best one of the predefined interface configuration options based at least on the DC voltage detection and the AC dial tone signal analysis performed by the microcontroller processor.

17. The system of claim 11, wherein the configuration circuitry includes:
   a microcontroller processor configured to detect the DC voltage on the TX channel of the connection interface;
   a digital signal processor (DSP) configured to analyze the AC dial tone signal on the RX channel of the connection interface; and
   a headset device processor configured to select the best one of the predefined interface configuration options based at least on the detected DC voltages and analyzed the AC dial tone signals.

18. The system of claim 17, wherein the DSP is a component of the headset device processor.

19. A method for automated configuration of a connection interface between a headset device and a telephone, the method comprising:
   detecting, by configuration circuitry provided in the headset device, an off-hook status of the telephone;
   in response to detecting the off-hook status of the telephone, automatically enabling or displaying a user input interface for receiving user input to initiate an automated configuration process;
   receiving, at the configuration circuitry, a configuration initiation command; and in response to the configuration initiation command, performing the automated configuration process by the configuration circuitry, including:
sequentially analyzing each of a plurality of predefined interface configuration options for the connection interface between the headset device and the telephone, wherein analyzing each respective predefined interface configuration option comprises:
setting a plurality of controllable switches to predefined switch positions corresponding with the respective predefined interface configuration option; and
performing a signal analysis to analyze electrical signals on at least one channel of the connection interface;
based on the signal analysis performed for each of the plurality of predefined interface configuration options, selecting a best one of the predefined interface configuration options; and
setting the plurality of controllable switches to the predefined switch positions corresponding with the selected predefined interface configuration option.

20. A system for automated configuration of a connection interface between a headset device and a telephone, the system comprising:
a plurality of controllable switches;
non-transitory memory storing configuration information defining predefined switch positions corresponding with each of a plurality of predefined interface configuration options for the connection interface between the headset device and the telephone; and
configuration circuitry configured to:
detect an off-hook status of the telephone;
in response to detecting the off-hook status of the telephone, automatically enable or display a user input interface for receiving user input to initiate an automated configuration process;
receive a configuration initiation command; and
in response to the configuration initiation command, perform the automated configuration process including:
sequentially analyzing each of a plurality of predefined interface configuration options for the connection interface between the headset device and the telephone, wherein analyzing each respective predefined interface configuration option comprises:
accessing the stored configuration information from the non-transitory memory;
based on the accessed configuration information, setting the plurality of controllable switches to predefined switch positions corresponding with the respective predefined interface configuration option; and
performing a signal analysis to analyze electrical signals on at least one channel of the connection interface;
selecting a best one of the predefined interface configuration options based on the signal analyses performed for the plurality of predefined interface configuration options; and
setting the plurality of controllable switches to the predefined switch positions corresponding with the selected predefined interface configuration option.

* * * * *